United States Patent
Tsai

(10) Patent No.: US 11,729,030 B2
(45) Date of Patent: Aug. 15, 2023

(54) DE-SKEW CIRCUIT, DE-SKEW METHOD, AND RECEIVER

(71) Applicant: FARADAY TECHNOLOGY CORPORATION, Hsinchu (TW)

(72) Inventor: Yi-Che Tsai, Hsinchu (TW)

(73) Assignee: FARADAY TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/692,230

(22) Filed: Mar. 11, 2022

(65) Prior Publication Data

US 2023/0077161 A1 Mar. 9, 2023

(30) Foreign Application Priority Data

Sep. 6, 2021 (TW) ................................. 110133051

(51) Int. Cl.
*H04L 25/14* (2006.01)
*H04L 25/06* (2006.01)
*H04L 25/02* (2006.01)

(52) U.S. Cl.
CPC .......... *H04L 25/14* (2013.01); *H04L 25/0202* (2013.01); *H04L 25/068* (2013.01)

(58) Field of Classification Search
CPC ... H04L 25/14; H04L 25/0202; H04L 25/068; H04L 25/22; H04L 25/242; H04L 25/245; H04L 25/247; H04L 25/0016; H04L 25/0033; H04L 25/0041; H04L 25/0045; H04L 25/005

See application file for complete search history.

(56) References Cited

U.S. PATENT DOCUMENTS

| | | | | |
|---|---|---|---|---|
| 5,948,080 A | * | 9/1999 | Baker | .................... G06F 9/4411 375/E7.274 |
| 5,983,301 A | * | 11/1999 | Baker | ..................... G06F 13/28 710/22 |
| 5,996,032 A | * | 11/1999 | Baker | ............... H04L 12/40123 358/1.11 |
| 6,006,286 A | * | 12/1999 | Baker | ..................... H04L 49/90 710/24 |
| 6,081,852 A | * | 6/2000 | Baker | .............. H04N 21/43632 710/24 |

(Continued)

OTHER PUBLICATIONS

Office Action issued by Taiwan Intellectual Property Office dated Apr. 14, 2022.

*Primary Examiner* — James M Perez
(74) *Attorney, Agent, or Firm* — WPAT, P.C

(57) ABSTRACT

A de-skew circuit, a de-skew method and a receiver are provided. The de-skew circuit includes N data synchronization circuits and a controller. An nth data synchronization circuit among the N data synchronization circuits includes an nth command detector and an nth buffer. The nth command detector changes an nth command detection signal when an nth input data stream satisfies a single channel condition. The nth buffer stores the nth input data stream in response to a voltage change of the nth command detection signal. The controller receives the nth command detection signal and changes a pop signal when a global channel condition is satisfied. The nth buffer outputs an nth timing-aligned data stream in response to a voltage change of the pop signal.

18 Claims, 10 Drawing Sheets

(56) References Cited

U.S. PATENT DOCUMENTS

| | | | | |
|---|---|---|---|---|
| 6,333,938 B1* | 12/2001 | Baker | | H04N 21/43632 375/E7.278 |
| 6,654,824 B1* | 11/2003 | Vila | | H04L 7/005 713/400 |
| 6,757,348 B1* | 6/2004 | Vila | | H04L 7/02 375/372 |
| 7,606,341 B2* | 10/2009 | Pereira | | H04L 25/14 375/354 |
| 7,697,628 B2* | 4/2010 | Choi | | H04L 25/085 341/55 |
| 7,822,111 B2* | 10/2010 | Sohn | | H04L 7/0058 375/348 |
| 8,064,535 B2* | 11/2011 | Wiley | | H04L 7/033 341/58 |
| 8,161,210 B1* | 4/2012 | Norrie | | H04L 25/14 710/33 |
| 8,285,884 B1* | 10/2012 | Norrie | | G06F 13/4278 710/52 |
| 8,385,374 B1* | 2/2013 | Wohlgemuth | | H04L 25/14 370/464 |
| 8,411,703 B1* | 4/2013 | Cory | | G06F 1/10 713/400 |
| 8,732,375 B1* | 5/2014 | Vijayaraghavan | | G06F 13/385 710/316 |
| 8,972,646 B2* | 3/2015 | Ranganathan | | G06F 13/4027 710/305 |
| 9,032,123 B2* | 5/2015 | Tanabe | | H04L 25/14 710/72 |
| 9,432,298 B1* | 8/2016 | Smith | | H04L 49/9057 |
| 9,444,551 B2* | 9/2016 | Fang | | H04B 10/29 |
| 9,886,072 B1* | 2/2018 | Venkataraman | | G06F 1/329 |
| 10,637,690 B1* | 4/2020 | Tsai | | H04L 25/03057 |
| 11,145,343 B1* | 10/2021 | Subramanian | | G11C 7/109 |
| 11,381,222 B2* | 7/2022 | Chen | | H03K 3/012 |
| 11,418,207 B1* | 8/2022 | Wang | | H03M 1/1215 |
| 11,616,298 B2* | 3/2023 | Tsai | | H01Q 1/2291 343/893 |
| 2003/0219040 A1* | 11/2003 | Kim | | H04J 3/0608 370/503 |
| 2005/0005051 A1* | 1/2005 | Tseng | | G06F 13/385 710/310 |
| 2005/0015522 A1* | 1/2005 | Elboim | | G06F 13/102 710/52 |
| 2005/0024926 A1* | 2/2005 | Mitchell | | G11C 7/1078 365/154 |
| 2005/0025119 A1* | 2/2005 | Pettey | | H04L 49/25 370/351 |
| 2005/0141601 A1* | 6/2005 | Renaud | | G06F 13/4086 375/219 |
| 2005/0144342 A1* | 6/2005 | Renaud | | G06F 13/385 710/52 |
| 2005/0201454 A1* | 9/2005 | Chaudhuri | | H04L 25/03343 375/229 |
| 2006/0061517 A1* | 3/2006 | Jolly | | G09G 5/003 345/1.1 |
| 2006/0156083 A1* | 7/2006 | Jang | | G06F 13/423 714/700 |
| 2007/0177701 A1* | 8/2007 | Thanigasalam | | H04L 7/02 375/372 |
| 2008/0130814 A1* | 6/2008 | Li | | G06F 13/4217 375/372 |
| 2008/0147916 A1* | 6/2008 | Mao | | G06F 5/06 710/52 |
| 2008/0174347 A1* | 7/2008 | Oshima | | G06F 1/12 327/147 |
| 2010/0315134 A1* | 12/2010 | Murari | | H04L 7/0012 327/145 |
| 2011/0235444 A1* | 9/2011 | Chuang | | G11C 11/413 365/189.16 |
| 2013/0101058 A1* | 4/2013 | Hummel | | H04J 3/047 375/259 |
| 2013/0111083 A1* | 5/2013 | Wu | | H04L 1/0041 710/52 |
| 2014/0189459 A1* | 7/2014 | Vijayaraghavan | | H03M 13/353 714/755 |
| 2015/0220140 A1* | 8/2015 | Por | | G06F 1/266 710/314 |
| 2015/0293175 A1* | 10/2015 | Chang | | G01R 31/31727 714/700 |
| 2016/0077994 A1* | 3/2016 | Hamada | | G06F 13/4022 710/313 |
| 2016/0179710 A1* | 6/2016 | Das Sharma | | G06F 13/1642 710/310 |
| 2016/0182257 A1* | 6/2016 | Froelich | | H04L 25/0262 375/229 |
| 2017/0346617 A1* | 11/2017 | Bandi | | H04L 7/033 |
| 2019/0044650 A1* | 2/2019 | Khan | | H04L 7/00 |
| 2019/0205244 A1* | 7/2019 | Smith | | G06F 3/065 |
| 2019/0229412 A1* | 7/2019 | Kuo | | H01Q 1/38 |
| 2019/0273571 A1* | 9/2019 | Bordogna | | H04J 3/073 |
| 2020/0145341 A1* | 5/2020 | Das Sharma | | H04L 1/0041 |
| 2021/0392065 A1* | 12/2021 | Sela | | H04L 1/0061 |
| 2022/0231414 A1* | 7/2022 | Tsai | | H01Q 1/243 |
| 2022/0294603 A1* | 9/2022 | Le | | H04L 7/0041 |
| 2022/0385000 A1* | 12/2022 | Chen | | H01B 7/009 |
| 2023/0077161 A1* | 3/2023 | Tsai | | H04L 25/14 |

\* cited by examiner

DE-SKEW CIRCUIT, DE-SKEW METHOD, AND RECEIVER

This application claims the benefit of Taiwan application Serial No. 110133051, filed Sep. 6, 2021, the disclosure of which is incorporated by reference herein in its entirety.

TECHNICAL FIELD

The disclosure relates in general to a de-skew circuit, a de-skew method, and a receiver, and more particularly to a de-skew circuit, a de-skew method, and a receiver to eliminate skew in multi-lane data transmission.

BACKGROUND

Peripheral Component Interconnect Express (PCIe) standard is an important input/output (I/O) interface. Transmitter/receiver systems adopting the PCIe architecture become more widespread.

Please refer to FIG. 1, which is a block diagram illustrating a PCIe transmitter/receiver system. The transmitter 11 transmits data rxDAT to the receiver 13. The receiver 13 includes a physical layer (PHY) 131 and a media access control (MAC) 133. The physical layer 131 converts the data rxDAT in a serial format into an input data steam inDAT in a parallel format, then transmits the input data stream inDAT to the media access control (MAC) 133.

The PCIe supports a multi-lane architecture. There are N data lanes wherein the number n is a positive integer and a power of two ($2^n$). In an ideal condition, the input data streams inDAT(L1)~inDAT(LN) transmitted in the data lanes Lane_1~Lane_N have aligned timing. However, in practical applications, the input data streams inDAT(L1)~inDAT(LN) transmitted in the data lanes Lane_1~Lane_N of the multi-lane architecture may be out of synchronization so as to have unaligned timing. This unaligned timing of the input data streams inDAT(L1)~inDAT(LN) in the data lanes Lane_1~Lane_N of the multi-lane architecture is called lane-to-lane skew.

Please refer to FIG. 2A, which is a schematic diagram showing the input data streams inDAT(L1)~inDAT(L4) generated by the physical layer in the ideal condition. In this diagram, the input data streams inDAT(L1)~inDAT(L4) corresponding to the data lanes Lane_1~Lane_4 are sequentially shown from top to bottom, and the x-axis represents the time. Each interval between any two adjacent time points t1~t9 is a symbol period Tsym required for transmitting one byte (equivalent to a symbol). Each input data stream inDAT(L1)~inDAT(L4) includes several input bytes inByte. Every four successive input bytes inByte in one data lane Lane_1~Lane_4 is defined as a doubleword DW. To show the bit sequence of the input bytes, the most significant bit (MSB) and the least significant bit (LSB) are marked above the corresponding input bytes.

The input data stream inDAT(L1) corresponding to the data lane Lane_1 includes the input bytes inByte1, inByte5, inByte9, inByte13, inByte17, inByte21, inByte25, inByte29, and so forth. In the input data stream inDAT(L1), the first input byte inByte1, the second input byte inByte5, the third input byte inByte9 and the fourth input byte inByte13 collectively form a data doubleword DW11. Similarly, in the input data stream inDAT(L1), the fifth input byte inByte17, the sixth input byte inByte21, the seventh input byte inByte25 and the eighth input byte inByte29 collectively form a data doubleword DW12.

The input data stream inDAT(L2) corresponding to the data lane Lane_2 includes the input bytes inByte2, inByte6, inByte10, inByte14, inByte18, inByte22, inByte26, inByte30, and so forth. In the input data stream inDAT(L2), the first input byte inByte2, the second input byte inByte6, the third input byte inByte10 and the fourth input byte inByte14 collectively form a data doubleword DW21. Similarly, in the input data stream inDAT(L2), the fifth input byte inByte18, the sixth input byte inByte22, the seventh input byte inByte26 and the eighth input byte inByte30 collectively form a data doubleword DW22.

The input data stream inDAT(L3) corresponding to the data lane Lane_3 includes the input bytes inByte3, inByte7, inByte11, inByte15, inByte19, inByte23, inByte27, inByte31, and so forth. In the input data stream inDAT(L3), the first input byte inByte3, the second input byte inByte7, the third input byte inByte11 and the fourth input byte inByte15 collectively form a data doubleword DW31. Similarly, in the input data stream inDAT(L3), the fifth input byte inByte19, the sixth input byte inByte23, the seventh input byte inByte27 and the eighth input byte inByte31 collectively form a data doubleword DW32.

The input data stream inDAT(L4) corresponding to the data lane Lane_4 includes the input bytes inByte4, inByte8, inByte12, inByte16, inByte20, inByte24, inByte28, inByte32, and so forth. In the input data stream inDAT(L4), the first input byte inByte4, the second input byte inByte8, the third input byte inByte12 and the fourth input byte inByte16 collectively form a data doubleword DW41. Similarly, in the input data stream inDAT(L4), the fifth input byte inByte20, the sixth input byte inByte24, the seventh input byte inByte28 and the eighth input byte inByte32 collectively form a data doubleword DW42.

In the ideal condition, the timing of the input data streams inDAT(L1)~inDAT(L4) is aligned. For example, as shown in FIG. 2A, the data doubleword DW11 of the input data stream inDAT(L1), the data doubleword DW21 of the input data stream inDAT(L2), the data doubleword DW31 of the input data stream inDAT(L3) and the data doubleword DW41 of the input data stream inDAT(L4) are synchronously outputted between time points t1 and t5. Similarly, the data doubleword DW12 of the input data stream inDAT(L1), the data doubleword DW22 of the input data stream inDAT(L2), the data doubleword DW32 of the input data stream inDAT(L3) and the data doubleword DW42 of the input data stream inDAT(L4) are synchronously outputted between time points t5 and t9.

However, if there exists inconsistent signal latency between the transmission paths of the data lanes Lane_1~Lane_4, the timing of the input data streams inDAT(L1)~inDAT(L4) can not remain aligned. In practical applications, various types of unaligned timing of the input data streams inDAT(L1)~inDAT(L4) could be observed. FIG. 2B shows one example of the unaligned timing.

Please refer to FIG. 2B, which is a schematic diagram showing the input data streams inDAT(L1)~inDAT(L4) generated by the physical layer in practical applications. In this diagram, the data doubleword DW11 of the input data stream inDAT(L1) is aligned with (synchronous with) the data doubleword DW41 of the input data stream inDAT(L4), and the data doubleword DW21 of the input data stream inDAT(L2) is aligned with (synchronous with) the data doubleword DW31 of the input data stream inDAT(L3). However, the data doubleword DW11 of the input data stream inDAT(L1) and the data doubleword DW41 of the input data stream inDAT(L4) are not aligned with (synchronous with) the data doubleword DW21 of the input data stream inDAT(L2) and the data doubleword DW31 of the input data stream inDAT(L3).

In the data lanes Lane_1 and Lane_4, the data doublewords DW12 and DW42 are aligned with the data doubleword DW21 of the input data stream inDAT(L2). In other words, the receiving time point (that is, time point t5) of the data doubleword DW21 of the input data stream inDAT(L2) and the data doubleword DW31 of the input data stream inDAT(L3) lags behind the receiving time point (that is, time point t1) of the data doubleword DW11 of the input data stream inDAT(L1) and the data doubleword DW41 of the input data stream inDAT(L4). The lag is equivalent to one doubleword duration Tdw. In the specification, the greatest time difference between receiving the input data streams inDAT(L1)~inDAT(L4) in the data lanes Lane_1~Lane_4 is called the timing skew period Tdiff of the data lanes Lane_1~Lane_4.

Once the media access control (MAC) 133 receives the input data stream inDAT(L1)~inDAT(L4) with unaligned timing, the media access control (MAC) 133 can not parse the transaction layer packet (TLP) and the data link layer packet (DLLP) correctly. Therefore, to keep normal operations of the receiver 13, the unaligned timing of the input data streams inDAT(L1)~inDAT(L4) needs correction.

SUMMARY

The disclosure is directed to a de-skew circuit, a de-skew method and a receiver for synchronizing the data transmitted through the multiple data lanes.

According to one embodiment, a de-skew circuit is provided. The de-skew circuit includes N data synchronization circuits and a controller. The N data synchronization circuits transform N input data streams with timing skew into N timing-aligned data streams with aligned timing. An nth data synchronization circuit among the N data synchronization circuits includes an nth command detector and an nth buffer. The nth command detector changes an nth command detection signal when an nth input data stream among the N input data streams satisfies a single lane condition. The nth buffer stores the nth input data stream in response to a voltage change of an nth push signal. The controller is electrically connected to the N data synchronization circuits. The controller receives the nth command detection signal and changes a pop signal connected to the nth buffer when a global lane condition is satisfied. The nth buffer outputs the stored nth input data stream as an nth timing-aligned data stream of the N timing-aligned data streams in response to a voltage change of the pop signal wherein n and N are positive integers and n is less than or equal to N.

According to another embodiment, A de-skew method used with a de-skew circuit is provided. The de-skew method includes the following steps. At first, N input data streams with timing skew are received from a physical layer. Then, an nth input data stream among the N input data streams is stored when the nth input data stream satisfies a single lane condition. The stored N input data streams are outputted as N timing-aligned data streams with aligned timing when a global lane condition is satisfied. The global lane condition relates to the single lane condition. At last, the N timing-aligned data streams are transmitted to a media access control wherein n and N are positive integers and n is less than or equal to N.

According to an alternative embodiment, a receiver is provided. The receiver includes a physical layer, a media access control and a de-skew circuit. The physical layer generates N input data streams with timing skew. The media access control receives N timing-aligned data streams with aligned timing. The de-skew circuit is electrically connected to the physical layer and the media access control. The de-skew circuit includes N data synchronization circuits and a controller. The N data synchronization circuits transform the N input data streams into the N timing-aligned data streams. An nth data synchronization circuit among the N data synchronization circuits includes an nth command detector and an nth buffer. The nth command detector changes an nth command detection signal when an nth input data stream among the N input data streams satisfies a single lane condition. The nth buffer stores the nth input data stream in response to a voltage change of the nth command detection signal. The controller is electrically connected to the N data synchronization circuits. The nth buffer receives the nth command detection signal and changes a pop signal connected to the nth buffer when a global lane condition is satisfied. The nth buffer outputs the stored nth input data stream as an nth timing-aligned data stream of the N timing-aligned data streams in response to a voltage change of the pop signal wherein n and N are positive integers and n is less than or equal to N.

Figures 1, 2A:
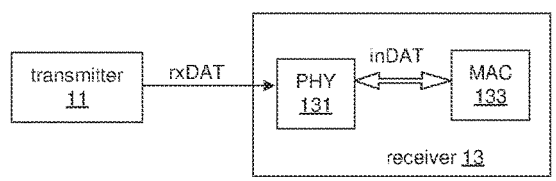
FIG. 1 (prior art) shows a block diagram illustrating a PCIe transmitter/receiver system.
FIG. 2A (prior art) shows the input data streams inDAT(L1)~inDAT(L4) generated by the physical layer in an ideal condition.
Figure 2B:
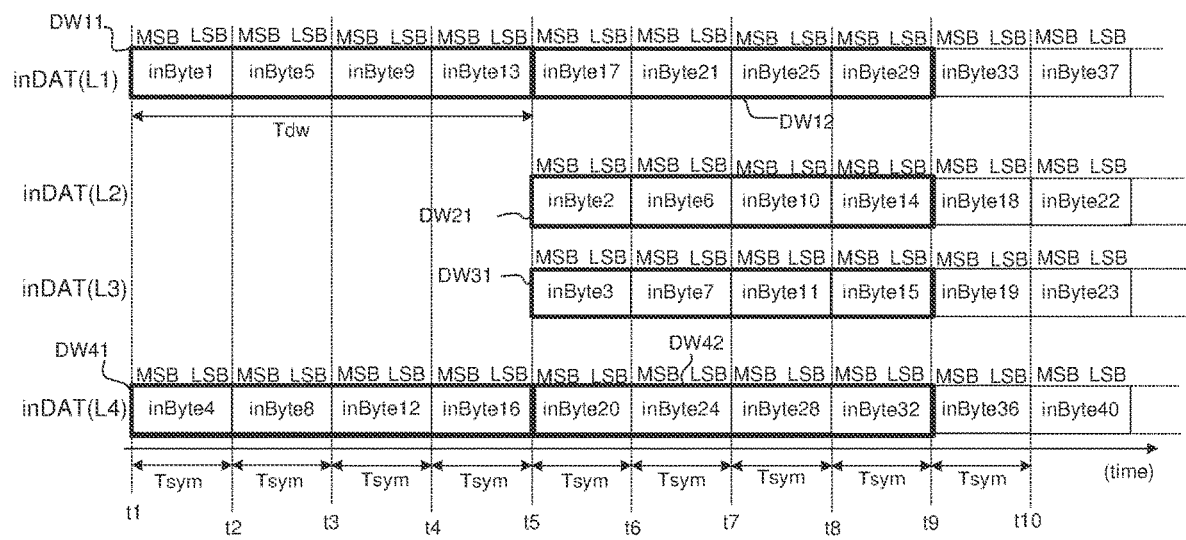
FIG. 2B (prior art) shows the input data streams inDAT(L1)~inDAT(L4) generated by the physical layer in practical applications.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

According to the present disclosure, a de-skew circuit is introduced between the physical layer (PHY) and the media access control (MAC) to provide timing-aligned data to the media access control (MAC). The de-skew circuit adjusts the timing of the asynchronous input data streams inDAT(L1)~inDAT(LN) to generate the synchronous timing-aligned data streams algnDAT(L1)~algnDAT(LN). Afterwards, the de-skew circuit transmits the timing-aligned data streams algnDAT(L1)~algnDAT(LN) to the media access control (MAC). Thus, the media access control (MAC) can correctly parse the packet based on the timing-aligned data streams algnDAT(L1)~algnDAT(LN).

Figure 3:
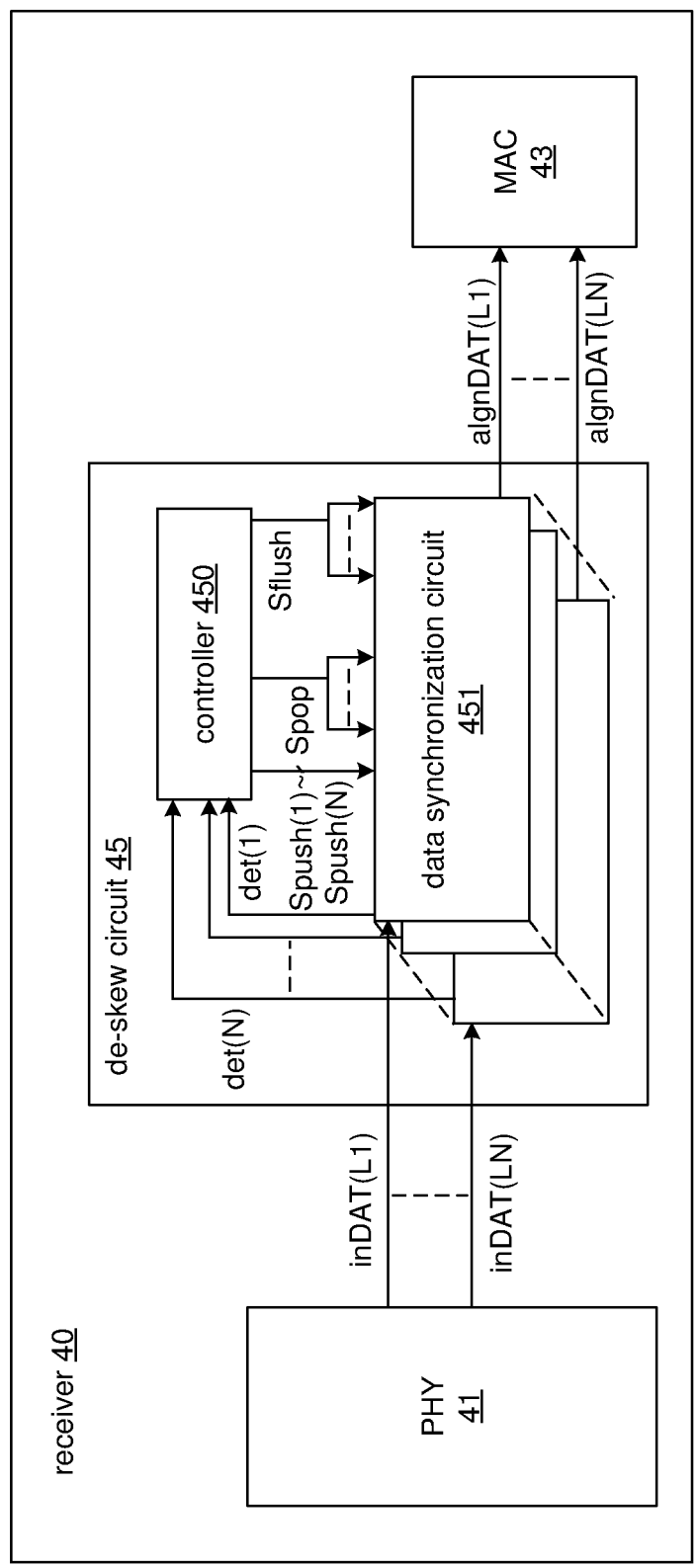
FIG. 3 shows a de-skew circuit used between a physical layer and a media access control (MAC) according to an embodiment of the present disclosure.

Please refer to FIG. 3, which is a schematic diagram illustrating that a de-skew circuit used between the physical layer (PHY) and the media access control (MAC) according to an embodiment of the present disclosure. For illustration purposes, the single-related symbol may indicate a signal line or a signal transmitted through the signal line according to the context.

In FIG. 3, the receiver 40 includes a physical layer (PHY) 41, a de-skew circuit 45 and a media access control (MAC) 43. The de-skew circuit 45 is electrically connected to the physical layer (PHY) 41 through the input data lines inDAT(L1)~inDAT(LN), and is electrically connected to the media access control (MAC) 43 through the timing-aligned data lines algnDAT(L1)~algnDAT(LN). According to the concepts of the present disclosure, the de-skew circuit 45 may receive the input data streams inDAT(L1)~inDAT(LN) at different time points, but will output the timing-aligned data streams algnDAT(L1)~algnDAT(LN) with aligned timing. Therefore, the media access control (MAC) 43 can correctly parse the packet.

The de-skew circuit 45 includes a controller 450 and N data synchronization circuits 451 corresponding to the data lanes Lane_1~Lane_N. The controller 450 are electrically connected to the data synchronization circuits 451 through command detection signal lines det(1)~det(N), push signal lines Spush(1)~Spush(N), pop signal lines Spop and flush signal lines Sflush. For illustration purposes only, the number N is set to four, but the number N is not limited to the embodiment.

Figure 4:
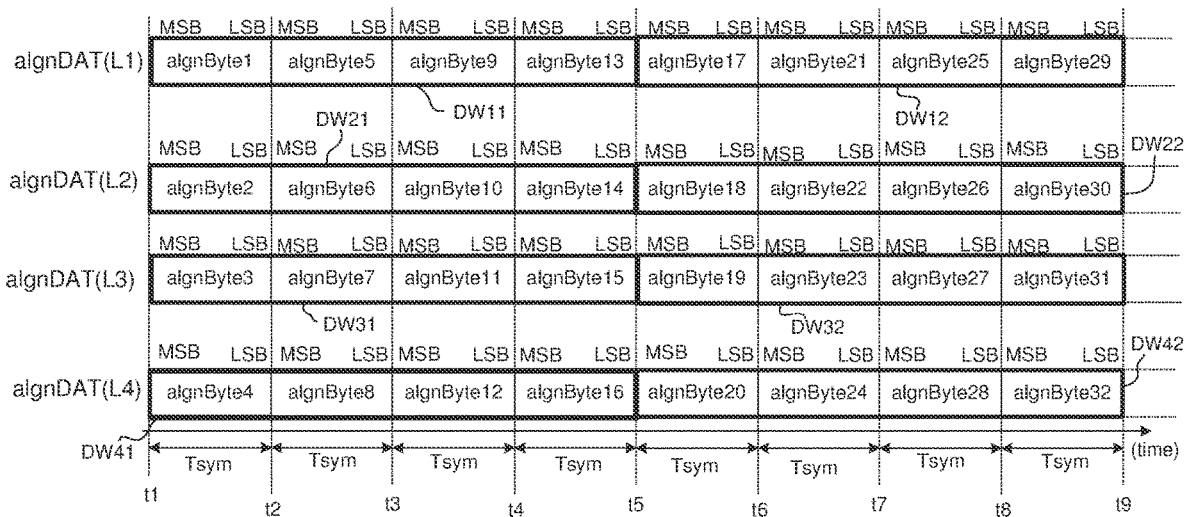
FIG. 4 shows timing-aligned data streams algnDAT(L1)~algnDAT(L4) generated by the de-skew circuit.

Please refer to FIG. 4, which is schematic diagram showing the timing-aligned data streams algnDAT(L1)~algnDAT(L4). In this diagram, the timing-aligned data streams algnDAT(L1)~algnDAT(L4) are sequentially shown from top to bottom and the x-axis represents the time. The intervals between any two adjacent timing points t1~t9 are defined as a symbol period Tsym. The timing-aligned data streams algnDAT(L1)~algnDAT(L4) correspond to the data lanes Lane_1~Lane_4, respectively.

The timing-aligned data stream algnDAT(L1) corresponding to the data lane Lane_1 includes timing-aligned bytes algnByte1, algnByte5, algnByte9, algnByte13, algnByte17, algnByte21, algnByte25, algnByte29, and so forth. The first timing-aligned byte algnByte1, the second timing-aligned byte algnByte5, the third timing-aligned byte algnByte9 and the fourth timing-aligned byte algnByte13 of the timing-aligned data stream algnDAT(L1) collectively form the data doubleword DW11. Similarly, the fifth timing-aligned byte algnByte17, the sixth timing-aligned byte algnByte21, the seventh timing-aligned byte algnByte25 and the eighth timing-aligned byte algnByte29 of the timing-aligned data stream algnDAT(L1) collectively form the data doubleword DW12.

The timing-aligned data stream algnDAT(L2) corresponding to the data lane Lane_2 includes timing-aligned bytes algnByte2, algnByte6, algnByte10, algnByte14, algnByte18, algnByte22, algnByte26, algnByte30, and so forth. The first timing-aligned byte algnByte2, the second timing-aligned byte algnByte6, the third timing-aligned byte algnByte10 and the fourth timing-aligned byte algnByte14 of the timing-aligned data stream algnDAT(L2) collectively form the data doubleword DW21. Similarly, the fifth timing-aligned byte algnByte18, the sixth timing-aligned byte algnByte22, the seventh timing-aligned byte algnByte26 and the eighth timing-aligned byte algnByte30 of the timing-aligned data stream algnDAT(L2) collectively form the data doubleword DW22.

The timing-aligned data stream algnDAT(L3) corresponding to the data lane Lane_3 includes timing-aligned bytes algnByte3, algnByte7, algnByte11, algnByte15, algnByte19, algnByte23, algnByte27, algnByte31, and so forth. The first timing-aligned byte algnByte3, the second timing-aligned byte algnByte7, the third timing-aligned byte algnByte11 and the fourth timing-aligned byte algnByte15 of the timing-aligned data stream algnDAT(L3) collectively form the data doubleword DW31. Similarly, the fifth timing-aligned byte algnByte19, the sixth timing-aligned byte algnByte23, the seventh timing-aligned byte algnByte27 and the eighth timing-aligned byte algnByte31 of the timing-aligned data stream algnDAT(L3) collectively form the data doubleword DW32.

The timing-aligned data stream algnDAT(L4) corresponding to the data lane Lane_4 includes timing-aligned bytes algnByte4, algnByte8, algnByte12, algnByte16, algnByte20, algnByte24, algnByte28, algnByte32, and so forth. The first timing-aligned byte algnByte4, the second timing-aligned byte algnByte8, the third timing-aligned byte algnByte12 and the fourth timing-aligned byte algnByte16 of the timing-aligned data stream algnDAT(L4) collectively form the data doubleword DW41. Similarly, the fifth timing-aligned byte algnByte20, the sixth timing-aligned byte algnByte24, the seventh timing-aligned byte algnByte28 and the eighth timing-aligned byte algnByte32 of the timing-aligned data stream algnDAT(L4) collectively form the data doubleword DW42.

The timing-aligned data streams algnDAT(L1)~algnDAT(L4) outputted by the de-skew circuit 45 have aligned timing. For example, the data doubleword DW11 of the timing-aligned data stream algnDAT(L1), the data doubleword DW21 of the timing-aligned data stream algnDAT(L2), the data doubleword DW31 of the timing-aligned data stream algnDAT(L3) and the data doubleword DW41 of the timing-aligned data stream algnDAT(L4) are aligned with (synchronous with) each other. Also, the data doubleword DW12 of the timing-aligned data stream algnDAT(L1), the data doubleword DW22 of the timing-aligned data stream algnDAT(L2), the data doubleword DW32 of the timing-aligned data stream algnDAT(L3) and the data doubleword DW42 of the timing-aligned data stream algnDAT(L4) are aligned with (synchronous with) each other.

According to the concepts of the present disclosure, the physical layer (PHY) 41 takes an appropriate command from the PCIe ordered set and adds the command into each input data stream inDAT(L1)~inDAT(LN) in order to determine the data timing relationships. According to the PCIe specification, the command of the ordered set includes 16 symbols, each of which has one byte. According to the concepts of the present disclosure, the ordered set suitable for determining whether the timing is aligned or not could be an electrical idle exit ordered set (EIEOS) or a start of data stream (SDS) ordered set. To give concise description, the de-skew circuit 45 makes the determination according to the EIEOS in the embodiments below. In practical applications, the operations of the de-skew circuit 45 are applicable to any case no matter which command is used for determining the receiving time points of the input data streams and what the command is interpreted.

Figure 5:
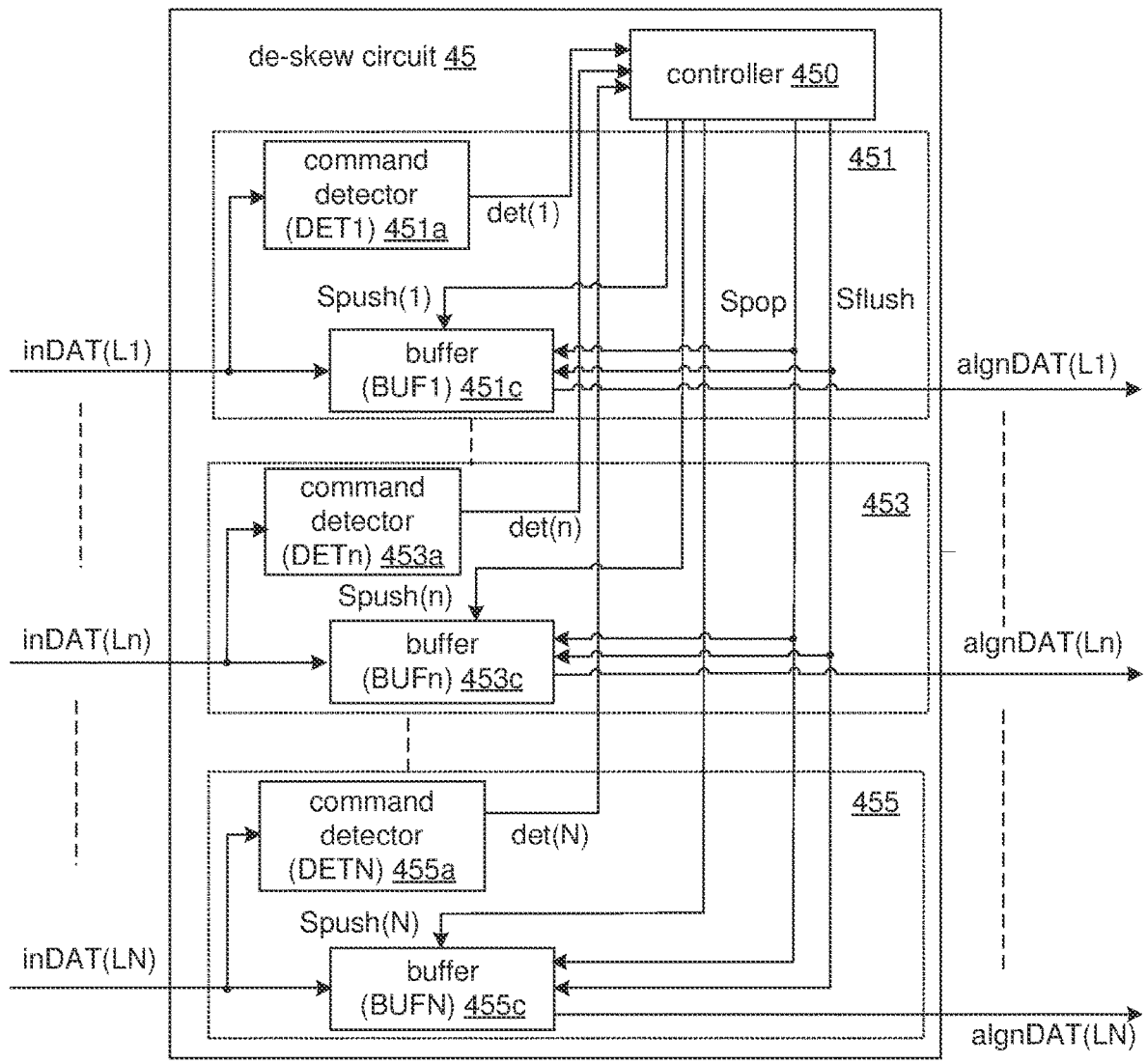
FIG. 5 shows a block diagram illustrating the de-skew circuit applied to data lanes Lane_1~Lane_N.

Please refer to FIG. 5, which is a block diagram illustrating the de-skew circuit applied to the data lanes Lane_1~Lane_N. For illustration purposes, only the data synchronization circuit 451 corresponding to the data lane Lane_1, the data synchronization circuit 453 corresponding to the data lane Lane_n and the data synchronization circuit 455 corresponding to the data lane Lane_N are shown in this diagram.

The data synchronization circuit 451 includes a command detector (DET1) 451a and a buffer (BUF1) 451c; the data synchronization circuit 453 includes a command detector (DETn) 453a and a buffer (BUFn) 453c; and the data synchronization circuit 455 includes a command detector (DETN) 455a and a buffer (BUFN) 455c. The buffer (BUF1) 451c, the buffer (BUFn) 453c and the buffer (BUFN) 455c could be first-in first-out (FIFO) buffers of equal size.

After receiving the input data stream inDAT(L1), the data synchronization circuit 451, controlled by the controller 450, selectively load the input data stream inDAT(L1) into the buffer (BUF1) 451c to adjust the time point of generating the timing-aligned data stream algnDAT(L1). Similarly, after receiving the input data stream inDAT(Ln), the data synchronization circuit 453, controlled by the controller 450, selectively loads the input data stream inDAT(Ln) into the buffer (BUFn) 453c to adjust the time point of generating the timing-aligned data stream algnDAT(Ln). Similarly, after receiving the input data stream inDAT(LN), the data synchronization circuit 455, controlled by the controller 450, selectively loads the input data stream inDAT(LN) into the buffer (BUFN) 455c to adjust the time point of generating the timing-aligned data stream algnDAT(LN).

In FIG. 5, the controller 450 synchronously transmits a pop signal Spop to the data synchronization circuits 451, 453 and 455, respectively. Immediately after receiving the pop signal Spop, the buffer (BUF1) 451c, the buffer (BUFn) 453c and the buffer (BUFN) 455c synchronously output the loaded input data streams inDAT(L1), inDAT(Ln) and inDAT(LN), respectively, as the timing-aligned data streams algnDAT(L1), algnDAT(Ln) and algnDAT(LN).

In addition to the pop signal Spop, the controller 450 also synchronously transmits a flush signal Sflush to the data synchronization circuits 451, 453 and 455, respectively, when a specific condition is met. For example, any buffer 451c, 453c, 455c is full, but the controller 450 has not transmitted the pop signal Spop to the data synchronization circuits 451, 453 and 455.

In the data synchronization circuit 451, the command detector (DET1) 451a and the buffer (BUF1) 451c are electrically connected to the physical layer (PHY) 41 and the controller 450. The buffer (BUF1) 451c is further electrically connected to the media access control (MAC) 43.

Both the command detector (DET1) 451a and the buffer (BUF1) 451c receive the input data stream inDAT(L1) from the physical layer (PHY) 41. Depending on the input data stream inDAT(L1), the command detector (DET1) 451 selectively changes the command detection signal det(1). When the controller 450 detects the voltage change of the command detection signal det(1) (for example, from a low voltage to a high voltage), the controller 450 changes the push signal Spush(1) (for example, from a low voltage to a high voltage) to be transmitted to the buffer (BUF1) 451c.

When the buffer (BUF1) 451c receives the push signal Spush(1) at the low voltage, the buffer (BUF1) 451c does not hold the input data stream inDAT(L1). At this time, the buffer (BUF1) 451c operates based on the command relating to timing alignment. For example, if the command is an EIEOS command, the physical layer (PHY) 41 selectively drops the input data stream inDAT(L1), transmitted from the physical layer (PHY) 41, in response to the push signal Spush(1) at the low voltage. Alternatively, if the command is an SDS command, the buffer (BUF1) 451c transmits the input data stream inDAT(L1), transmitted from the physical layer (PHY) 41, to the media access control (MAC) 43 in response to the push signal Spush(1) at the low voltage.

When the buffer (BUF1) 451c receives the push signal Spush(1) at the high voltage, the buffer (BUF1) 451c temporarily stores the input data stream inDAT(L1) till the voltage of the pop signal Spop or the flush signal Sflush sent by the controller 450 changes. The voltage of the pop signal Spop and the voltage of the flush signal Sflush are changed in response to different conditions. Therefore, the voltage of the pop signal Spop and the flush signal Sflush will not change concurrently. When the buffer (BUF1) 451c receives the altered pop signal Spop, the buffer (BUF1) 451c starts to transmit the loaded data. On the other hand, when the buffer (BUF1) 451c detects that the voltage of the flush signal Sflush changes, the buffer (BUF1) 451c discards the input data stream inDAT(L1) loaded therein.

According to the concepts of the present disclosure, the data synchronization circuits 451, 453, 455 have similar internal architecture and work in a similar way. Therefore, the connection relations between the data synchronization circuits 451, 455 (including the command detector (DETn) 453a, the command detector (DETN) 455a, the buffer (BUFn) 453c and the buffer (BUFN) 455c), the controller 450, the physical layer (PHY) 41 and the media access control (MAC) 43 could be obtained without further detailed description. Also, the operations of the command detector (DETn) 453a, the command detector (DETN) 455a, the buffer (BUFn) 453c and the buffer (BUFN) 455c could refer to the previous description.

In FIG. 5, each command detector DET1~DETN determines whether the single lane condition is met individually. Once the command detector DET1~DETN finds that the corresponding input data stream inDAT(L1)~inDAT(LN) includes the predefined command CMDpre, the command detector DET1~DETN determines that the single lane condition is satisfied, and generates and sends the corresponding command detection signal det(1)~det(N) to the controller 450. Once receiving the command detection signal det(1)~det(N), the controller 450 immediately alters the voltage of the push signal Spush(1)~Spush(N) corresponding to the received command detection signal det(1)~det(N). As shown in FIG. 5, the controller 450 is electrically connected to the buffers BUF1~BUFN through the push signal lines Spush(1)~Spush(N), respectively. When the push signal Spush(1)~Spush(N) connected to the buffer BUF1~BUFN is changed from the low voltage to the high voltage, the buffer BUF1~BUFN holds the corresponding input data stream inDAT(L1)~inDAT(LN) temporarily.

The controller 450 generates the pop signal Spop and the flush signal Sflush for all buffers BUF1~BUFN, but not generates respective pop signals Spop and respective flush signals Sflush for the buffers BUF1~BUFN. That is to say, the buffers BUF1~BUFN synchronously output the loaded input data streams inDAT(L1)~inDAT(LN) in response to the received altered pop signal Spop. Similarly, the buffers BUF1~BUFN synchronously discard the loaded input data streams inDAT(L1)~inDAT(LN) in response to the received altered flush signal Sflush.

The present disclosure further defines a global lane condition. When the global lane condition is met, the controller 450 alters the voltage of the pop signal Spop (for example, from the low voltage to the high voltage). The global lane condition is that the controller 450 successfully receives the command detection signals det(1)~det(N) corresponding to all of the data lanes Lane_1~Lane_N within a command-period Tord, starting from the time point that the controller 450 receives the first command detection signal det(n) (n=1~N).

According to the concepts of the present disclosure, when the global lane condition is met, the buffers BUF1~BUFN receives the pop signal Spop from the controller 450 at the same time. Once the pop signal Spop is changed from the low voltage to the high voltage, the buffers BUF1~BUFN synchronously output the loaded input data streams inDAT (L1)~inDAT(LN) as the timing-aligned data streams algnDAT(L1)~algnDAT(LN).

Figure 6:
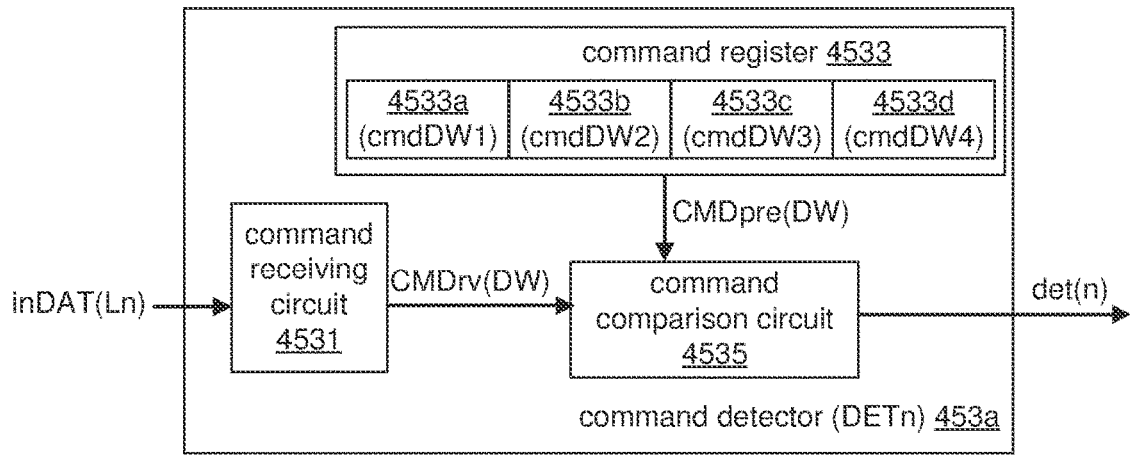
FIG. 6 shows a block diagram illustrating the command detector according to an embodiment of the present disclosure.

Please refer to FIG. 6, which is a block diagram illustrating the command detector according to an embodiment of the present disclosure. The command detector (DETn) 453*a* includes a command receiving circuit 4531, a command register 4533 and a command comparison circuit 4535. The command comparison circuit 4535 is electrically connected to the command receiving circuit 4531 and the command register 4533. The command register 4533 includes four parts, that is, a first command sub-register 4533*a*, a second command sub-register 4533*b*, a third command sub-register 4533*c* and a fourth command sub-register 4533*d*. The size of the command register 4533 is determined based on the command length defined by the specification associated with the receiver. For example, the command length has 128 bits based on PCIe Gen 3.0. Accordingly, each sub-register 4533*a*~4533*d* of the command register 4533 has a size corresponding to one command doubleword cmdDW1, cmdDW2, cmdDW3, cmdDW4.

For illustration purposes only, the predefined command CMDpre stored in the command register 4533 in the embodiment is an EIEOS command. In practical applications, the type or the number of the predefined command CMDpre stored in the command register 4533 needs not be limited. The command receiving circuit 4531 repetitively captures the data with a predefined length (for example, predefined length is equal to one doubleword, that is, four symbols) from the input data stream inDAT(Ln) as the input command CMDrv(DW). The input command is transmitted to the command comparison circuit 4535.

The command register 4533 also transmits the stored predefined command CMDpre(DW) to the command comparison circuit 4535. The command comparison circuit 4535 compares the predefined command CMDpre(DW) and the input command CMDrv(DW). If the two commands are identical, the command comparison circuit 4535 alters the voltage of the command detection signal det(n). If the two commands are different, the command comparison circuit 4535 does not alter the voltage of the command detection signal det(n). Once the command comparison circuit 4535 determines that the predefined command CMDpre(DW) and the input command CMDrv(DW) are identical, the command detector (DETn) 453*a* could stop the repetitive capturing and comparing steps.

In the above embodiment, if the predefined command CMDpre(DW) and the input command CMDrv(DW) are identical, the command comparison circuit 4535 alters the voltage of the command detection signal det(n). In practical applications, in order to expedite the procedure, the command comparison circuit 4535 does not compare the complete predefined command CMDpre(DW) with the complete input command CMDrv(DW), but could compare portions of the commands CMDpre(DW) and CMDrv(DW). For example, the predefined command CMDpre(DW) and the input command CMDrv(DW) are divided into four segments, respectively. The command comparison circuit 4535 only compares the first segment of the predefined command CMDpre(DW) with the first segment of the input command CMDrv(DW) (for example, the command doubleword cmdDW1). The voltage of the command detection signal det(n) is determined according to the comparison result of these first segments. Such variation could be adjusted to meet requirements of the system.

The EIEOS command may vary with the version of the PCIe. For example, the EIEOS command is FF00-FF00-FF00-FF00-FF00-FF00-FF00-FF00h according to specification of PCIe Gen 3.0. Alternatively, the EIEOS command is FFFF-0000-FFFF-0000-FFFF-0000-FFFF-0000h according to specification of PCIe Gen 4.0. It is to be noted that the only condition is that the predefined command CMDpre has a predefined and fixed form and can indicate the switching status of the signal. The type of the predefined command CMDpre needs not be limited. For example, The SDS order set could be adopted as the predefined command CMDpre. The SDS order set has a form of 5555-5555-5555-5555-5555-5555-5555-55E1h. For illustration purposes only, the predefined command CMDpre is set to the EIEOS command based on PCIe Gen 3.0 in the embodiments below.

Figure 7:
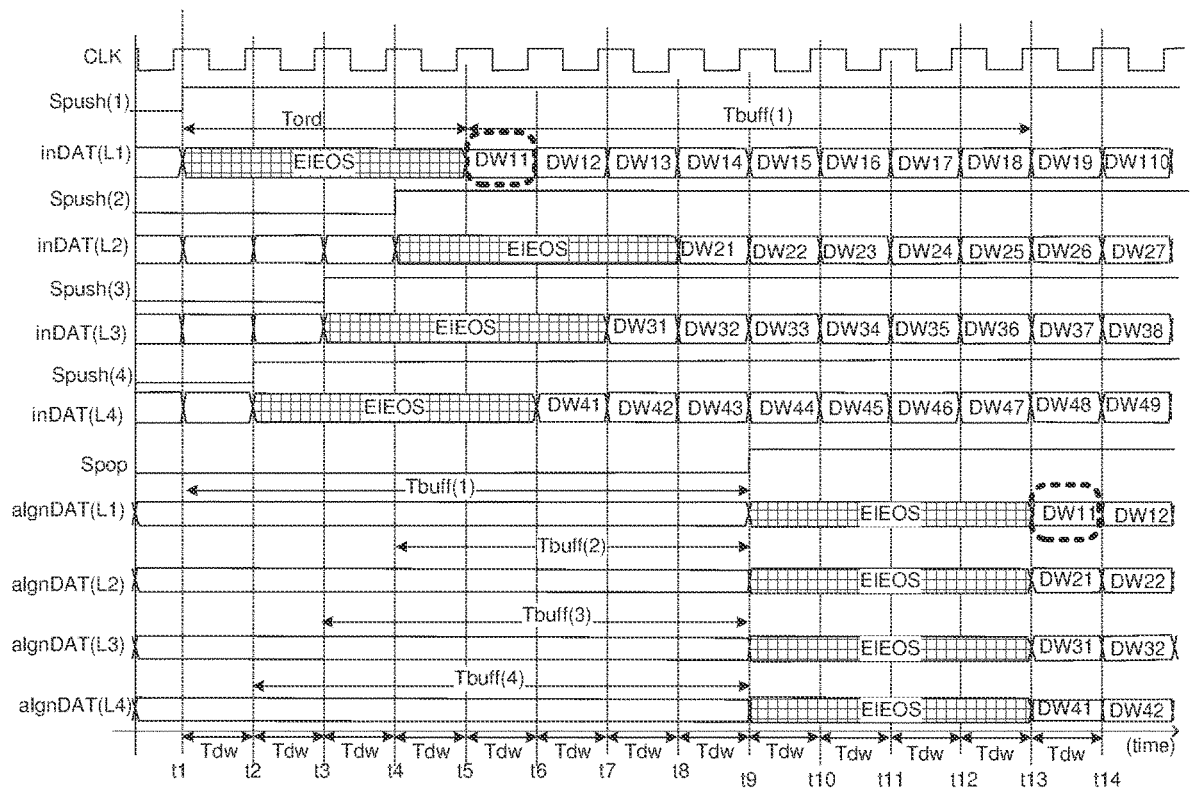
FIG. 7 shows waveforms of the input data streams inDAT with unaligned timing and the timing-aligned data streams algnDAT converted therefrom by the de-skew circuit.

Please refer to FIG. 7, which shows waveforms of the input data streams inDAT with unaligned timing and the timing-aligned data streams algnDAT converted therefrom by the de-skew circuit. In this diagram, the x-axis represents the time. Each interval between any two successive time points t1~t14 is defined as a doubleword period Tdw. In the embodiment, each data lane Lane_1-Lane_4 has a lane width of 32 bits (equivalent to the length of a doubleword DW). In FIG. 7, the 128-bit command is divided into four doublewords to be transmitted during the four doubleword periods Tdw, respectively. In other words, the command-period Tord consists of four doubleword periods (4*Tdw).

The signals shown in FIG. 7 are the clock signal CLK, the push signal Spush(1) and the input data stream inDAT(L1) corresponding to the data lane Lane_1, the push signal Spush(2) and the input data stream inDAT(L2) corresponding to the data lane Lane_2, the push signal Spush(3) and the input data stream inDAT(L3) corresponding to the data lane Lane_3, the push signal Spush(4) and the input data stream inDAT(L4) corresponding to the data lane Lane_4, the pop signal Spop and the timing-aligned data streams algnDAT (L1)~algnDAT(L4) corresponding to the data lanes Lane_1~Lane_4.

The command detector DET1 detects the EIEOS command in the input data stream inDAT(L1) at time point t1, and then sends the command detection signal det(1) to the controller 450. The controller 450 alters the push signal Spush(1) from the low voltage to the high voltage just after time point t1. The input data stream inDAT(L1) carries the EIEOS command during the command-period Tord between time points t1 and t5. Then, the input data stream inDAT(L1) successively carries the data doublewords DW11, DW12, DW13, DW14, DW15, DW16, DW17, DW18, DW19, DW110, and so forth. during the doubleword periods Tdw following time point t5.

The command detector DET2 detects the EIEOS command in the input data stream inDAT(L2) at time point t4, and then sends the command detection signal det(2) to the controller 450. The controller 450 alters the push signal Spush(2) from the low voltage to the high voltage just after time point t4. The input data stream inDAT(L2) carries the EIEOS command during the command-period Tord between time points t4 and t8. Then, the input data stream inDAT(L2) successively carries the data doublewords DW21, DW22, DW23, DW24, DW25, DW26, DW27, and so forth. during the doubleword periods Tdw following time point t8.

The command detector DET3 detects the EIEOS command in the input data stream inDAT(L3) at time point t3, and then sends the command detection signal det(3) to the controller 450. The controller 450 alters the push signal Spush(3) from the low voltage to the high voltage just after time point t3. The input data stream inDAT(L3) carries the EIEOS command during the command-period Tord between time points t3 and t7. Then, the input data stream inDAT(L3) successively carries the data doublewords DW31, DW32, DW33, DW34, DW35, DW36, DW37, DW38, and so forth. during the doubleword periods Tdw following time point t7.

The command detector DET4 detects the EIEOS command in the input data stream inDAT(L4) at time point t2, and then sends the command detection signal det(4) to the controller 450. The controller 450 alters the push signal Spush(4) from the low voltage to the high voltage just after time point t2. The input data stream inDAT(L4) carries the EIEOS command during the command-period Tord between time points t2 and t6. Then, the input data stream inDAT(L2) successively carries the data doublewords DW41, DW42, DW43, DW44, DW45, DW46, DW47, DW48, DW49, and so forth. during the doubleword periods Tdw following time point t6.

As shown in FIG. 7, the command detector DET1 first starts to receive the EIEOS command in the input data stream inDAT(L1) (between time points t1 and t5). Next, the command detector DET4 starts to receive the EIEOS command in the input data stream inDAT(L4) (between time points t2 and t6). Subsequently, the command detector DET3 starts to receive the EIEOS command in the input data stream inDAT(L3) (between time points t3 and t7). Finally, the command detector DET2 starts to receive the EIEOS command in the input data stream inDAT(L2) (between time points t4 and t8). After the EIEOS command in the last data lane Lane_2 is completely received at time point t8, the controller 450 alters the pop signal Spop from the low voltage to the high voltage at time point t9.

The buffers BUF1~BUF4 synchronously output the timing-aligned data streams algnDAT(L1)~algnDAT(L4) (beginning at time point t9) in response to the voltage change of the pop signal Spop at time point t9. Between time points t9 and t13, all of the timing-aligned data streams algnDAT(L1)~algnDAT(L4) carry the four command doublewords of the EIEOS command.

The timing-aligned data stream algnDAT(L1) carries the data doubleword DW11 between time points t13 and t14, and carries the data doubleword DW12 between time points t14 and t15. The timing-aligned data stream algnDAT(L2) carries the data doubleword DW21 between time points t13 and t14 and the data doubleword DW22 between time points t14 and t15. The timing-aligned data stream algnDAT(L3) carries the data doubleword DW31 between time points t13 and t14, and carries the data doubleword DW32 between time points t14 and t15. The timing-aligned data stream algnDAT(L4) carries the data doubleword DW41 between time points t13 and t14, and carries the data doubleword DW42 between time points t14 and t15.

The waveforms of the signals in FIG. 7 are now further described in the timing sequence. At time point t1, only the command detection signal det(1) is switched from the low voltage to the high voltage. Accordingly, the controller 450 determines that only the data lane Lane_1 receives the EIEOS command at time point t1. Therefore, the controller 450 determines that the timing skew period Tdiff of the data lanes Lane_1~Lane_4 is not shorter than a doubleword period Tdw, that is, Tdiff≥Tdw.

Till time point t2, the voltages of the command detection signals det(1) and det(4) have been changed, but the voltages of the command detection signals det(2) and det(3) have not been changed. Accordingly, the controller 450 determines that the data lanes Lane_2 and Lane_3 have not started to receive the EIEOS command at time point t2. Therefore, the controller 450 determines that the timing skew period Tdiff of the data lanes Lane_1~Lane_4 is not shorter than two doubleword periods Tdw*2, that is, Tdiff≥2*Tdw.

Till time point t3, the voltages of the command detection signals det(1), det(4), and det(3) have been changed, but the voltage of the command detection signal det(2) has not been changed. Accordingly, the controller 450 determines that the data lane Lane_2 has not started to receive the EIEOS command at time point t3. Therefore, the controller 450 determines that the timing skew period Tdiff of the data lanes Lane_1~Lane_4 is not shorter than three doubleword periods Tdw*3, that is, Tdiff≥3*Tdw.

Till time point t4, the voltages of the command detection signals det(1), det(4), det(3) and det(2) have been changed. Therefore, the controller 450 determines that the timing skew period Tdiff of the data lanes Lane_1~Lane_4 is equal to three doubleword periods Tdw*3, that is, Tdiff=3*Tdw.

As described above, the data synchronization circuit corresponding to the data lane Lane_1 starts to receive the EIEOS command at time point t1. Next, the data synchronization circuit corresponding to the data lane Lane_4 starts to receive the EIEOS command at time point t2. Subsequently, the data synchronization circuit corresponding to the data lane Lane_3 starts to receive the EIEOS command at time point t3. Finally, the data synchronization circuit corresponding to the data lane Lane_2 starts to receive the EIEOS command at time point t4. The time difference between reception of the EIEOS command in the data lanes Lane_1 and Lane_2 is equal to (t4−t1)=3 doubleword periods Tdw*3. Because one doubleword period Tdw is equivalent to four symbol periods (Tdw=4*Tsym), the timing skew period Tdiff of the data lanes Lane_1~Lane_4 in FIG. 7 is equivalent to twelve symbol periods (Tdiff=Tdw*3=Tsym*12).

Till time point t5, the EIEOS command in the input data stream inDAT(L1) has been completely received. Afterwards, the buffer BUF1 receives the data doubleword DW11 in the input data stream inDAT(L1) between time points t5 and t6. At the same time, the buffer BUF2 receives the second command doubleword in the input data stream inDAT(L2); the buffer BUF3 receives the third command doubleword in the input data stream inDAT(L3); and the buffer BUF4 receives the fourth command doubleword in the input data stream inDAT(L4).

Till time point t6, the EIEOS command in the input data streams inDAT(L1) and inDAT(L4) have been completely received. Afterwards, between time points t6 and t7, the buffer BUF1 receives the data doubleword DW12 in the input data stream inDAT(L1), and the buffer BUF4 receives the data doubleword DW41 in the input data stream inDAT(L4). At the same time, the buffer BUF2 receives the third command doubleword in the input data stream inDAT(L2) and the buffer BUF3 receives the fourth command doubleword in the input data stream inDAT(L3).

Till time point t7, the EIEOS command in the input data streams inDAT(L1), inDAT(L3) and inDAT(L4) have been completely received. Afterwards, between time points t7 and t8, the buffer BUF1 receives the data doubleword DW13 in the input data stream inDAT(L1); the buffer BUF3 receives the data doubleword DW31 in the input data stream inDAT (L3); and the buffer BUF4 receives the data doubleword DW42 in the input data stream inDAT(L4). At the same time, the buffer BUF2 receives the fourth command doubleword in the input data stream inDAT(L2).

Till time point t8, the EIEOS command of the data lanes Lane_1, Lane_2, Lane_3 and Lane_4 have been completely received. Afterwards, between time points t8 and t9, the buffer BUF1 receives the data doubleword DW14 in the input data stream inDAT(L1); the buffer BUF2 receives the data doubleword DW21 in the input data stream inDAT(L2); the buffer BUF3 receives the data doubleword DW32 in the input data stream inDAT(L3); and the buffer BUF4 receives the data doubleword DW43 in the input data stream inDAT (L4).

After time point t9, the command detectors DET1~DET4 may stop detecting the EIEOS command, and the buffers BUF1~BUF4 start to synchronously output the timing-aligned data stream algnDAT(L1)~algnDAT(L4).

Between time points t9 and t10, the data doubleword DW15 in the input data stream inDAT(L1), the data doubleword DW22 in the input data stream inDAT(L2), the data doubleword DW33 in the input data stream inDAT(L3) and the data doubleword DW44 in the input data stream inDAT (L4) are sent to and loaded in the buffers BUF1, BUF2, BUF3 and BUF4, respectively. At this time, the buffers BUF1, BUF2, BUF3 and BUF4 respectively output the timing-aligned data streams algnDAT(L1)~algnDAT(L4) with the contents of the first command doublewords of EIEOS command.

Between time points t10 and t11, the data doubleword DW16 in the input data stream inDAT(L1), the data doubleword DW23 in the input data stream inDAT(L2), the data doubleword DW34 in the input data stream inDAT(L3) and the data doubleword DW45 in the input data stream inDAT (L4) are sent to and loaded in the buffers BUF1, BUF2, BUF3 and BUF4, respectively. At this time, the buffers BUF1, BUF2, BUF3 and BUF4 start to respectively output the timing-aligned data streams algnDAT(L1)~algnDAT (L4) with the contents of the second command doublewords of EIEOS command.

Between time points t11 and t12, the data doubleword DW17 in the input data stream inDAT(L1), the data doubleword DW24 in the input data stream inDAT(L2), the data doubleword DW35 in the input data stream inDAT(L3) and the data doubleword DW46 in the input data stream inDAT (L4) are sent to and loaded in the buffers BUF1, BUF2, BUF3 and BUF4, respectively. At this time, the buffers BUF1, BUF2, BUF3 and BUF4 respectively output the timing-aligned data streams algnDAT(L1)~algnDAT(L4) with the contents of the third command doublewords of EIEOS command.

Between time points t12 and t13, the data doubleword DW18 in the input data stream inDAT(L1), the data doubleword DW25 in the input data stream inDAT(L2), the data doubleword DW36 in the input data stream inDAT(L3) and the data doubleword DW47 in the input data stream inDAT (L4) are sent to and loaded in the buffers BUF1, BUF2, BUF3 and BUF4, respectively. At this time, the buffers BUF1, BUF2, BUF3 and BUF4 respectively output the timing-aligned data streams algnDAT(L1)~algnDAT(L4) with the contents of the fourth command doublewords of EIEOS command.

Between time points t13 and t14, the data doubleword DW19 in the input data stream inDAT(L1), the data doubleword DW26 in the input data stream inDAT(L2), the data doubleword DW37 in the input data stream inDAT(L3) and the data doubleword DW48 in the input data stream inDAT (L4) are sent to and loaded in the buffers BUF1, BUF2, BUF3 and BUF4, respectively. At this time, the buffer BUF1 outputs the data doubleword DW11 of the timing-aligned data stream algnDAT(L1) which is received and loaded between time points t5 and t6. The buffer BUF2 outputs the data doubleword DW21 of the timing-aligned data stream algnDAT(L2) which is received and loaded between time points t8 and t9. The buffer BUF3 outputs the data doubleword DW31 of the timing-aligned data stream algnDAT(L3) which is received and loaded between time points t7 and t8. The buffer BUF4 outputs the data doubleword DW41 of the timing-aligned data stream algnDAT(L4) which is received and loaded between time points t6 and t7.

The operations and signal behaviors posterior to time point t14 could be derived from the previous detailed description and will not be further given herein. It is to be noted that the voltage changes of the pop signal Spop and the flush signal Sflush are not limited to the embodiments. In practical applications, the controller 450 may alter the pop signal Spop and the flush signal Sflush from the high voltage to the low voltage to inform the buffers BUF1~BUF4 to output or discard the loaded input data streams.

In FIG. 7, the buffer BUF1 receives the first command doubleword (FF00-FF00h) of the input data stream inDAT (L1) at time point t1 and does not output the first command doubleword until time point t9. Therefore, the period between time points t1 and t9 is considered as the buffering period Tbuff(1) of the buffer BUF1 required for holding the data of the input data stream inDAT(L1). Similarly, the period between time points t4 and t9 is considered as the buffering period Tbuff(2) of the buffer BUF2 required for holding the first command doubleword (FF00-FF00h) of the input data stream inDAT(L2). Also, the period between time points t3 and t9 is considered as the buffering period Tbuff(3) of the buffer BUF3 required for holding the first command doubleword (FF00-FF00h) of the input data stream inDAT(L3). Further, the period between time points t2 and t9 is considered as the buffering period Tbuff(4) of the buffer BUF4 required for holding the first command doubleword (FF00-FF00h) of the input data stream inDAT(L4).

Since the buffer BUF1 is the first buffer receiving the EIEOS command, the size of the buffer BUF1 should be large enough to hold the first command doubleword of the EIEOS command of the input data stream inDAT(L1) from time point t1 to time point t9. The period is equivalent to eight doubleword periods 8*Tdw. Between time points t2 and t9, the buffer BUF1 further receives the second command doubleword, the third command doubleword, the fourth command doubleword and the data doublewords DW11, DW12, DW13 and DW14 successively. These command doublewords and data doublewords exist in the buffer BUF1 at time point t9. Therefore, before time point 9, the buffer BUF1 should hold the eight received doublewords (that is, four command doublewords and four data doublewords DW11, DW12, DW13, DW14), which are successively received between time points t1 and t9 (that is, eight doubleword periods 8*Tdw).

As marked by the dotted circles in FIG. 7, the data doubleword DW11 of the input data stream inDAT(L1) is sent to the buffer BUF1 at time point t5, and then outputted by the buffer BUF1 as the data doubleword DW11 of the timing-aligned stream algnDAT(L1) at time point t13. Therefore, the buffer BUF1 needs to hold the data doubleword DW11 between time points t5 and t13 (during 8*Tdw). Furthermore, between time points t5 and t13, the buffer BUF1 successively receives and holds the data doublewords DW12, DW13, DW14, DW15, DW16, DW17 and DW18 of the input data stream inDAT(L1). Therefore, in the input data stream inDAT(L1), all of the EIEOS command and the data doublewords DW11, DW12, DW13, DW14, DW15, DW16, DW17, DW18 need to be put in the buffer BUF1 for eight doubleword periods (Tbuff(1)=8*Tdw).

Since one doubleword consists of four bytes, the buffer BUF1 should provide the space of at least 8*4=32 bytes. In practical applications, the buffers BUF1~BUF4 do not receive the input data streams inDAT(L1)~inDAT(L4) in a regular sequence. Hence, the de-skew circuit provides the buffers BUF1~BUF4 with equal size. For example, each buffer BUF1~BUF4 with reference to FIG. 7 has the space of at least 32 bytes.

In practical applications, if there is greater timing skew between the data lanes Lane_1~Lane_N, the buffers BUF1~BUFN need greater space. According to such design, the first data lane Lane_n receives the input data stream can wait for a longer buffering period Tbuff(n) till other data lanes receive the input data streams. It is to be noted that the buffers BUF1~BUFN may operate with other control signals which could be stored in the buffers BUF1~BUFN. Also, the duration of the buffering periods Tbuff(n) and the size of the buffers BUFF1~BUFFN could vary according to the control signals, the design of the system or the application conditions.

Figure 8:
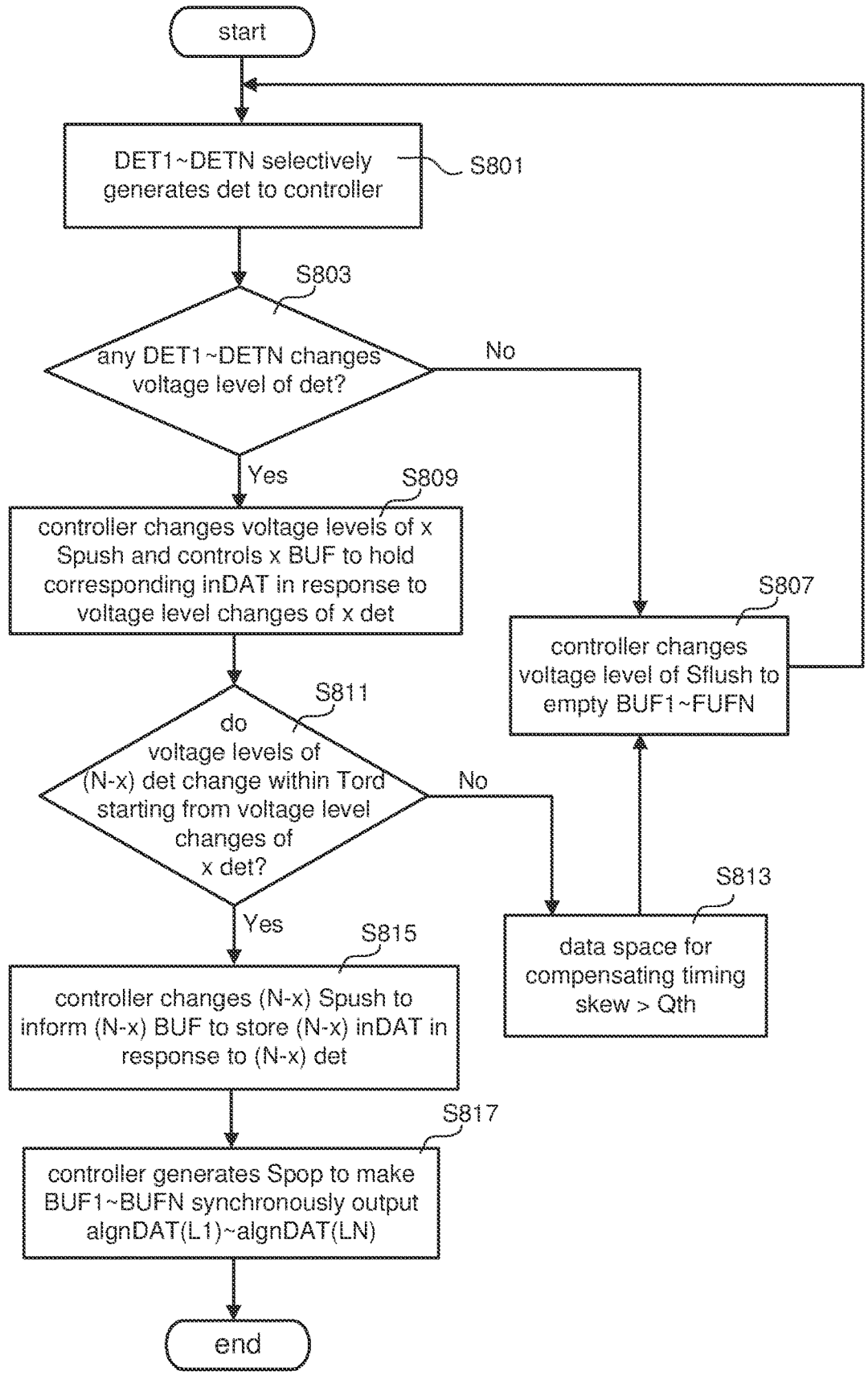
FIG. 8 shows a flowchart illustrating the de-skew method according to an embodiment of the present disclosure.

Please refer to FIG. 8, which is a flowchart illustrating the de-skew method according to an embodiment of the present disclosure. At first, the command detectors DET1~DETN selectively and individually generate and transmit respective command detection signals det(1)~det(N) to the controller 450 in response to the input data streams inDAT(L1)~inDAT (LN) transmitted from the physical layer (PHY) to the de-skew circuit (step S801). The details of how to generate the command detection signals det(1)~det(N) have been given with reference to FIG. 6.

Subsequently, the controller 450 determines whether any command detector DET1~DETN generates the command detection signal det (step S803). If it is determined no in step S803, the controller 450 generates and sends the flush signal Sflush to the buffers BUF1~BUFN to make the buffers BUF1~BUFN empty the loaded data (step S807), and then the method goes back to step S801.

If it is determined yes in step S803, the controller 450 will receive at least one command detection signal det. For illustration purposes, x command detectors DET generate the command detection signals det at this time in the embodiment, wherein x is a positive integer and x<N. For example, the command detectors DET1 and DET3 generate the command detection signals det(1) and det(3) first.

The controller 450 sends the corresponding push signals Spush (for example, the push signals Spush(1) and Spush (3)) to the buffers BUF (for example, the buffers BUF1 and BUF3) in response to the x received command detection signals det (for example, the command detection signals det(1) and det(3)). This step informs the buffers to load the input data streams inDAT (for example, the input data streams inDAT(L1) and inDAT(L3)) (step S809).

Afterwards, the controller 450 determines whether other (N-x) command detection signals det have been received within the command-period Tord, starting from time point that the controller 450 just receives the x command detection signals det (step S811). If it is determined no in step S811, the data need to be temporarily stored for compensating the timing skew exceeds the symbol length threshold Qth (for example, 32 symbols) (step S813). In this condition, the capacity of the buffers BUF1~BUFN is insufficient to compensate the asynchronization and timing skew. Therefore, the controller 450 sends a flush signal Sflush to the buffers BUF1~BUFN to empty the loaded data. The symbol length threshold Qth is considered as the minimum space provided by each buffer BUF1~BUFN and required for temporarily storing the corresponding input data steam inDAT(L1)~inDAT(LN).

The controller 450 receives the (N-x) command detection signals det during the command-period Tord, and sends the corresponding (N-x) push signals Spush to the corresponding (N-x) buffers BUF to control the buffers BUF to temporarily store the (N-x) input data streams inDAT corresponding to the (N-x) data lanes (step S815). While passing step S815, it represents that all of the data lanes Lane_1~Lane_N have received the EIEOS command. Therefore, the controller 450 sends a pop signal Spop to the buffers BUF1~BUFN, and the buffers BUF1~BUFN start to synchronously output the timing-aligned data streams algnDAT(L1)~algnDAT(LN) (step S817).

Figure 9A:
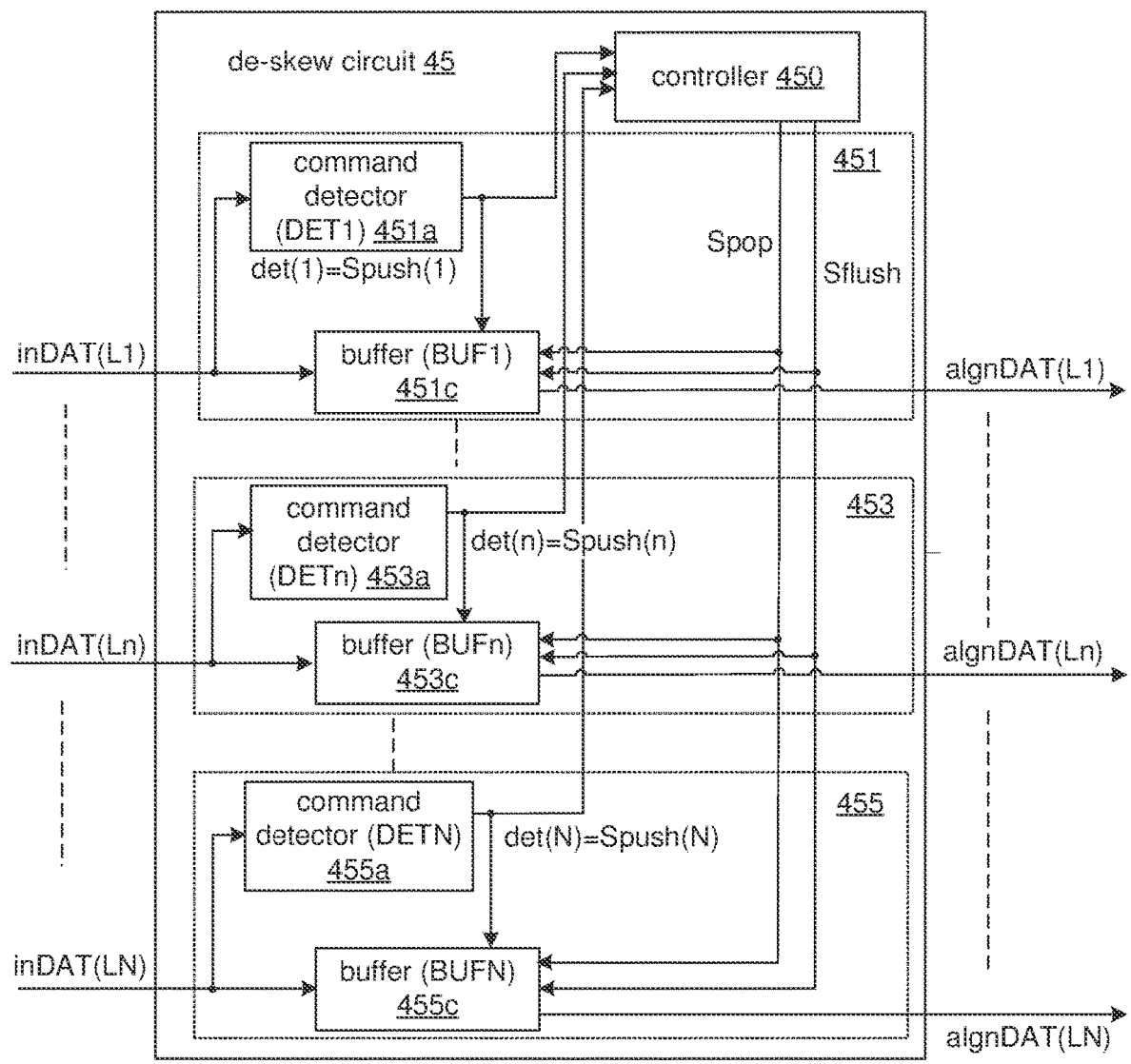
FIGS. 9A~9C show block diagrams illustrating de-skew circuits according to embodiments of the present disclosure.
Figure 9B:
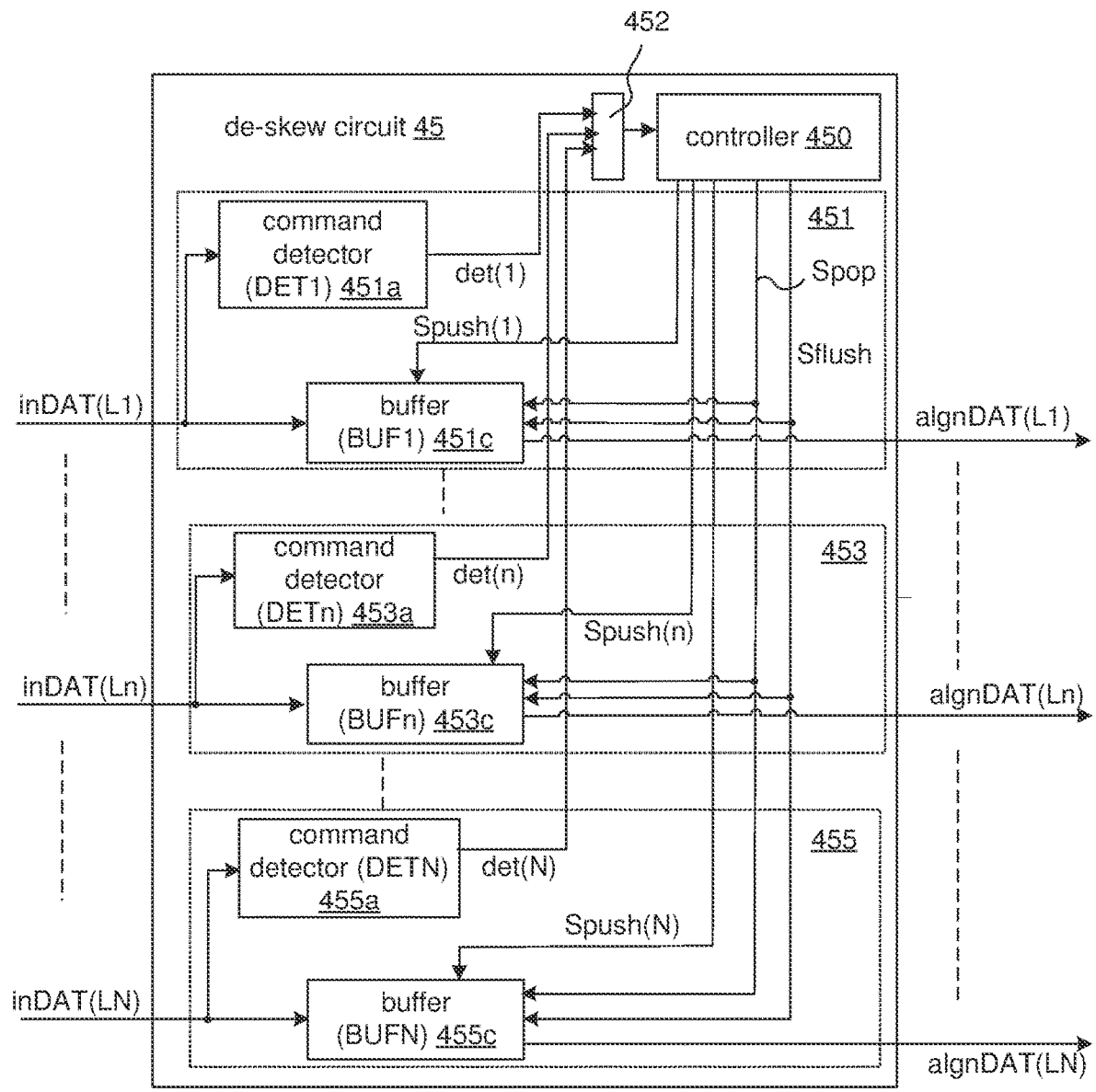
Figure 9C:
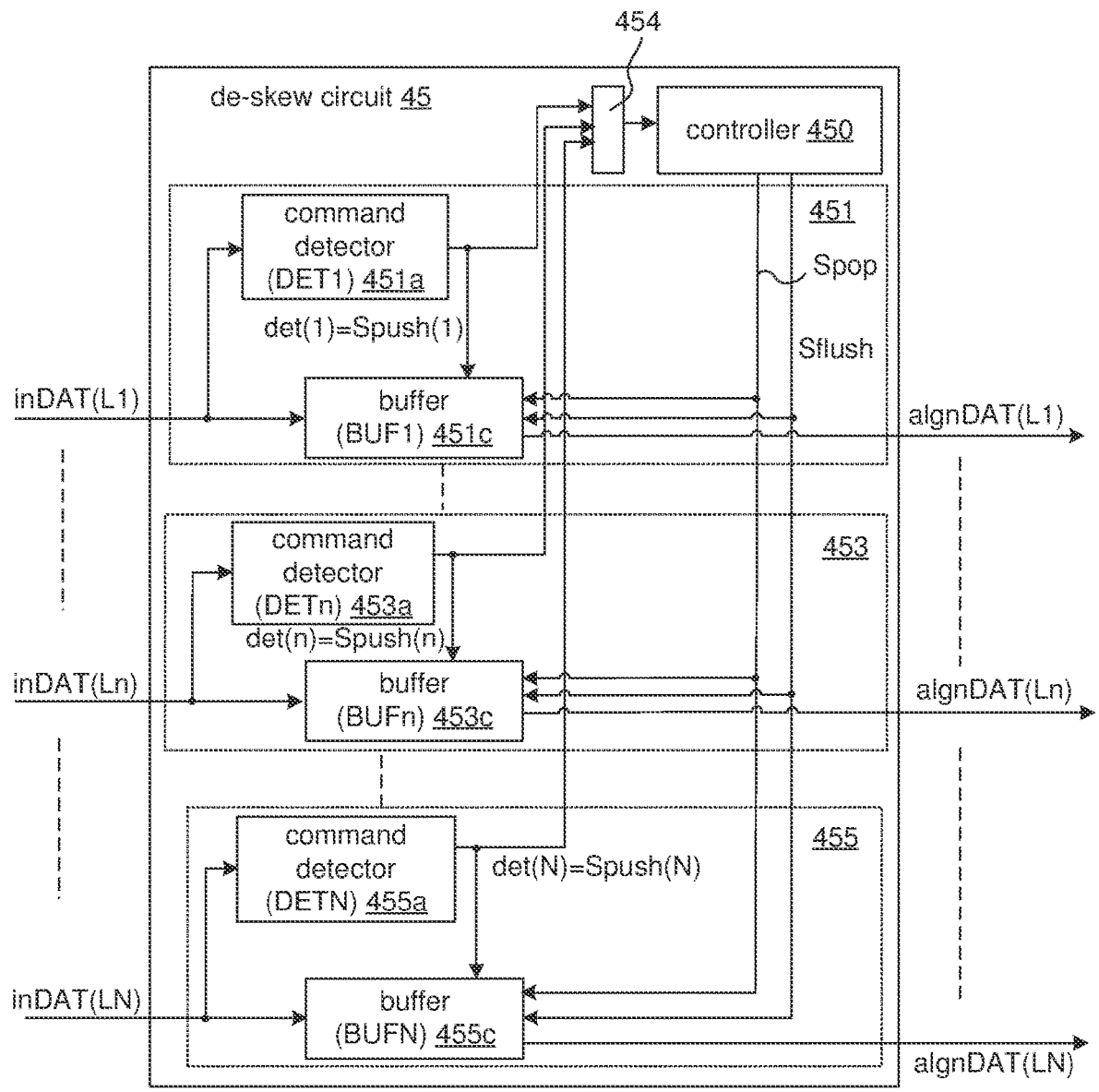

In practical applications, the command detection signals det(1)~det(N) generated by the command detectors DET1~DETN can control the buffers BUF1~BUFN in different ways. In FIG. 5, after the command detectors DET1~DETN transmit the command detection signals det (1)~det(N) to the controller 450, the controller 450 transmits the push signals Spush(1)~Spush(4) to the buffers BUF1~BUFN. FIGS. 9A~9C present other embodiments involving various variations.

Please refer to FIGS. 9A~9C, which are block diagrams illustrating de-skew circuits according to embodiments of the present disclosure. The structures in FIGS. 9A~9C are similar to the structure described with reference to FIG. 5, and only the noticeable difference is described herein. How the pop signal Spop and the flush signal Sflush are generated and how the related components operate can be obtained from the related description with reference to FIG. 5. Only the operations associated with one of the data synchronization circuits 451, 453 and 455 are described herein, and the operations associated with other data synchronization circuits having similar structure could be derived therefrom.

In FIG. 9A, the command detector (DET1) 451a transmits the command detection signal det(1) to both the controller 450 and the buffer (BUF) 451c concurrently. Thus, the command detection signal det(1) could be considered as the push signal Spush(1).

In FIG. 9B, the command detector (DET1) 451a writes the command detection signal det(1) into a register 452. The controller 450 reads the register 452 to decide whether/when to change the push signal Spush(1), the pop signal Spop and the flush signal Sflush connected to the buffers BUF1~BUFN.

In FIG. 9C, the command detector (DET1) 451a sends the command detection signal det(1) to the controller 450, the buffer (BUF) 451c and the register 454 at the same time. Thus, the command detection signal det(1) could be considered as the push signal Spush(1). Further, the controller 450 reads the register 454 to determine whether/when to generate the pop signal Spop and the flush signal Sflush.

According to the concepts of the present disclosure, the controller 450 sends the pop signal Spop and the flush signal Sflush in response to the command detection signals det(1)~det(N) generated by the command detectors DET1~DETN, and the buffers BUF1~BUFN temporarily store the input data streams inDAT(L1)~inDAT(LN) in response to the command detection signals det(1)~det(N). In practical applications, the connection relations of the command detectors DET1~DETN, the controller 450 and the buffers BUF1~BUFN and the use of the register or other circuits are not limited to the embodiments with reference to FIGS. 5 and 9A~9C.

According to the above description, the de-skew circuit of the present disclosure can hold the earlier-received input data streams in DAT for a longer time before outputting the timing-aligned data streams when there is timing skew between the data lanes. The de-skew circuit can ensure normal operations of the media access control (MAC) to prevent from incorrectly parsing the received packet.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A de-skew circuit, comprising:
    N data synchronization circuits, configured to transform N input data streams with timing skew into N timing-aligned data streams with aligned timing, wherein an nth data synchronization circuit among the N data synchronization circuits comprises:
        an nth command detector, configured to change a voltage of an nth command detection signal when an nth input data stream among the N input data streams satisfies a single lane condition; and
        an nth buffer, configured to store the nth input data stream in response to a voltage change of an nth push signal; and
    a controller, electrically connected to the N data synchronization circuits, configured to receive the nth command detection signal and change a voltage of a pop signal connected to the nth buffer when a global lane condition is satisfied, wherein the nth buffer outputs the stored nth input data stream as an nth timing-aligned data stream of the N timing-aligned data streams in response to a voltage change of the pop signal, wherein n and N are positive integers and n is less than or equal to N.

2. The de-skew circuit according to claim 1, wherein N is a power of two.

3. The de-skew circuit according to claim 1, wherein the nth buffer has a size related to a length of a predefined command.

4. The de-skew circuit according to claim 1, wherein the nth command detector comprises:
    a command receiving circuit, configured to receive an input command captured from the nth input data stream;
    a command register, configured to receive a predefined command; and
    a command comparison circuit, electrically connected to the command receiving circuit and the command register, configured to compare the predefined command and the input command, wherein the command comparison circuit determines that the single lane condition is satisfied and changes the nth command detection signal when at least one segment of the predefined command and at least one segment of the input command are identical.

5. The de-skew circuit according to claim 4, wherein the predefined command is an electrical idle exit ordered set or a start of data stream ordered set.

6. The de-skew circuit according to claim 1, wherein the controller changes the nth push signal in response a voltage change of the nth command detection signal.

7. The de-skew circuit according to claim 1, wherein the nth push signal is the nth command detection signal.

8. The de-skew circuit according to claim 1, wherein the global lane condition is satisfied when the controller receives N command detection signals from the N data synchronization circuits within a command-period.

9. The de-skew circuit according to claim 1, wherein a first input byte of the nth input data stream is asynchronous with a first input byte of at least one input data stream among (N-1) input data streams other than the nth input data stream.

10. The de-skew circuit according to claim 9, wherein a first timing-aligned byte of each of the N timing-aligned data streams is synchronous with each other.

11. The de-skew circuit according to claim 1, wherein the N data synchronization circuits are electrically connected between a physical layer and a media access control.

12. The de-skew circuit according to claim 11, wherein the N data synchronization circuits receive the N input data streams from the physical layer, respectively.

13. The de-skew circuit according to claim 11, wherein the N data synchronization circuits respectively transmit the N timing-aligned data streams to the media access control.

14. The de-skew circuit according to claim 1, wherein
    the controller sends a flush signal to the N data synchronization circuits when the global lane condition is not satisfied, and
    the nth buffer discards the stored nth input data stream in response to the flush signal.

15. A de-skew method used with a de-skew circuit comprising N data synchronization circuits and a controller, wherein the de-skew method comprises steps of:
    the N data synchronization circuits respectively receiving N input data streams with timing skew from a physical layer;
    an nth data synchronization circuit among the N data synchronization circuits changing a voltage of an nth command detection signal and storing an nth input data stream among the N input data streams when the nth input data stream satisfies a single lane condition;
    the controller receiving the nth command detection signal from the nth data synchronization circuit;
    the N data synchronization circuits outputting the stored N input data streams as N timing-aligned data streams with aligned timing in response to a pop signal changed by the controller when a global lane condition is satisfied, wherein the global lane condition is related to the single lane condition; and
    the de-skew circuit transmitting the N timing-aligned data streams to a media access control wherein n and N are positive integers and n is less than or equal to N.

16. The de-skew method according to claim 15, wherein the single lane condition corresponding to the nth data synchronization circuit is satisfied when the nth data synchronization circuit determines that the nth input data stream includes a predefined command.

17. A receiver, comprising:
    a physical layer, configured to generate N input data streams with timing skew;
    a media access control, configured to receive N timing-aligned data streams with aligned timing; and
    a de-skew circuit, electrically connected to the physical layer and the media access control, comprising:
        N data synchronization circuits, configured to transform the N input data streams into the N timing-aligned data streams, wherein an nth data synchronization circuit among the N data synchronization circuits comprises:

an nth command detector, configured to change a voltage of an nth command detection signal when an nth input data stream among the N input data streams satisfies a single lane condition; and an nth buffer, configured to store the nth input data stream in response to a voltage change of the nth command detection signal; and a controller, electrically connected to the N data synchronization circuits, configured to receive the nth command detection signal and change a voltage of a pop signal connected to the nth buffer when a global lane condition is satisfied, wherein the nth buffer outputs the stored nth input data stream as an nth timing-aligned data stream of the N timing-aligned data streams in response to a voltage change of the pop signal, wherein n and N are positive integers and n is less than or equal to N.

18. The receiver according to claim 17, wherein the nth command detector comprises:

a command receiving circuit, configured to receive an input command captured from the nth input data stream;

a command register, configured to receive a predefined command; and a command comparison circuit, electrically connected to the command receiving circuit and the command register, configured to compare the predefined command and the input command, wherein the command comparison circuit determines that the single lane condition is satisfied and changes the nth command detection signal when at least one segment of the predefined command and at least one segment of the input command are identical.

* * * * *